US011880148B2

(12) United States Patent
Matsumoto et al.

(10) Patent No.: US 11,880,148 B2
(45) Date of Patent: Jan. 23, 2024

(54) HEATING DEVICE AND IMAGE FORMING APPARATUS

(71) Applicant: FUJIFILM Business Innovation Corp., Tokyo (JP)

(72) Inventors: Mitsuhiro Matsumoto, Ebina (JP); Tetsuro Kodera, Ebina (JP); Yoshiki Shimodaira, Ebina (JP); Kosuke Yamada, Ebina (JP); Masato Yamashita, Ebina (JP); Takayuki Yamashita, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/522,298

(22) Filed: Nov. 9, 2021

(65) Prior Publication Data

US 2022/0066376 A1 Mar. 3, 2022

Related U.S. Application Data

(63) Continuation of application No. PCT/JP2019/050793, filed on Dec. 25, 2019.

(30) Foreign Application Priority Data

Jun. 25, 2019 (JP) ................................ 2019-117616

(51) Int. Cl.

*G03G 15/20* (2006.01)
*G03G 21/20* (2006.01)
*G03G 15/00* (2006.01)

(52) U.S. Cl.

CPC ..... *G03G 15/2007* (2013.01); *G03G 15/2003* (2013.01); *G03G 15/2021* (2013.01);
(Continued)

(58) Field of Classification Search

CPC .......... G03G 15/2003; G03G 15/2007; G03G 15/2098; B41J 11/002-00244
See application file for complete search history.

(56) References Cited

U.S. PATENT DOCUMENTS

2002/0191993 A1 12/2002 Bartscher et al.
2012/0039643 A1 2/2012 Chang et al.

FOREIGN PATENT DOCUMENTS

JP S55-041898 U 3/1980
JP S56-023956 U 3/1981
(Continued)

OTHER PUBLICATIONS

Feb. 10, 2020 Search Report issued in International Patent Application No. PCT/JP2019/050793.
(Continued)

*Primary Examiner* — Thomas S Giampaolo, II
(74) *Attorney, Agent, or Firm* — Oliff PLC

(57) ABSTRACT

A heating device includes: a heating unit configured to heat a transported material being transported in a transport direction in a non-contact manner with respect to the transported material; and a facing portion that is disposed on a side opposite to the heating unit with respect to the transported material and faces the heating unit in a facing direction intersecting the transport direction, wherein a length of the heating unit in the transport direction is longer than a length of the facing portion in the transport direction, or a length of the heating unit in an intersecting direction intersecting the transport direction and the facing direction is longer than a length of the facing portion in the intersecting direction.

16 Claims, 17 Drawing Sheets

(52) U.S. Cl.
CPC ....... *G03G 15/2064* (2013.01); *G03G 21/206* (2013.01); *G03G 15/6529* (2013.01)

(56) References Cited

FOREIGN PATENT DOCUMENTS

| | | | |
|---|---|---|---|
| JP | S58-113057 | U | 8/1983 |
| JP | S63-006471 | U | 1/1988 |
| JP | 2002-258643 | A | 9/2002 |
| JP | 2004-053855 | A | 2/2004 |
| JP | 2008-139779 | A | 6/2008 |
| JP | 2009-163065 | A | 7/2009 |
| JP | 2009-288491 | A | 12/2009 |
| JP | 2010-164787 | A | 7/2010 |
| JP | 5217634 | B2 | 6/2013 |
| JP | 2014-046522 | A | 3/2014 |
| JP | 2019-215474 | A | 12/2019 |

OTHER PUBLICATIONS

Feb. 10, 2020 Written Opinion issued in International Patent Application No. PCT/JP2019/050793.
Mar. 31, 2023 Office Action issued in Chinese Patent Application No. 201980097503.6.
Oct. 14, 2023 Office Action issued in Chinese Patent Application No. 201980097503.6.
Nov. 14, 2023 Office Action issued in Japanese Patent Application No. 2020-007752.

HEATING DEVICE AND IMAGE FORMING APPARATUS

CROSS-REFERENCE TO RELATED APPLICATIONS

This is a continuation of International Application No. PCT/JP2019/050793 filed on Dec. 25, 2019, and claims priority from Japanese Patent Application No. 2019-117616 filed on Jun. 25, 2019.

BACKGROUND

Technical Field

The present disclosure relates to a heating device and an image forming apparatus.

Related Art

JP-A-2010-164787 discloses a heating device that performs fixing, drying, and pre-fixing preheating on an unfixed print image formed on a transfer material such as a printing sheet using an infrared radiation heater. The heating device is provided on a back surface of the infrared radiation heater facing the transfer material, and includes, in addition to a back surface reflection plate that returns a radiation to the back surface of the infrared radiation heater to the transfer material, side reflection plates that are movable in a width direction of the transfer material on both sides of the transfer material in the width direction.

SUMMARY

In a heating device including a heating unit that heats a transported material being transported in a transport direction in a non-contact manner and a facing portion that faces the heating unit on a side opposite to a heating unit side with respect to the transported material, for example, when a length of the heating unit in the transport direction is equal to or less than a length of the facing portion in the transport direction, a temperature distribution may occur in the facing portion.

Aspects of non-limiting embodiments of the present disclosure relate to preventing an occurrence of the temperature distribution in the facing portion as compared with a configuration in which the length of the heating portion in the transport direction is equal to or less than the length of the facing portion in the transport direction, or a length of the heating unit in an intersecting direction is equal to or less than a length of the facing portion in the intersecting direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heating device including: a heating unit configured to heat a transported material being transported in a transport direction in a non-contact manner with respect to the transported material; and a facing portion that is disposed on a side opposite to the heating unit with respect to the transported material and faces the heating unit in a facing direction intersecting the transport direction, wherein a length of the heating unit in the transport direction is longer than a length of the facing portion in the transport direction, or a length of the heating unit in an intersecting direction intersecting the transport direction and the facing direction is longer than a length of the facing portion in the intersecting direction.

BRIEF DESCRIPTION OF DRAWINGS

Exemplary embodiment(s) of the present invention will be described in detail based on the following figures, wherein.

DETAILED DESCRIPTION

Hereinafter, an example of exemplary embodiments according to the present disclosure will be described with reference to the drawings.

(Image Forming Apparatus 10)

Figure 1:
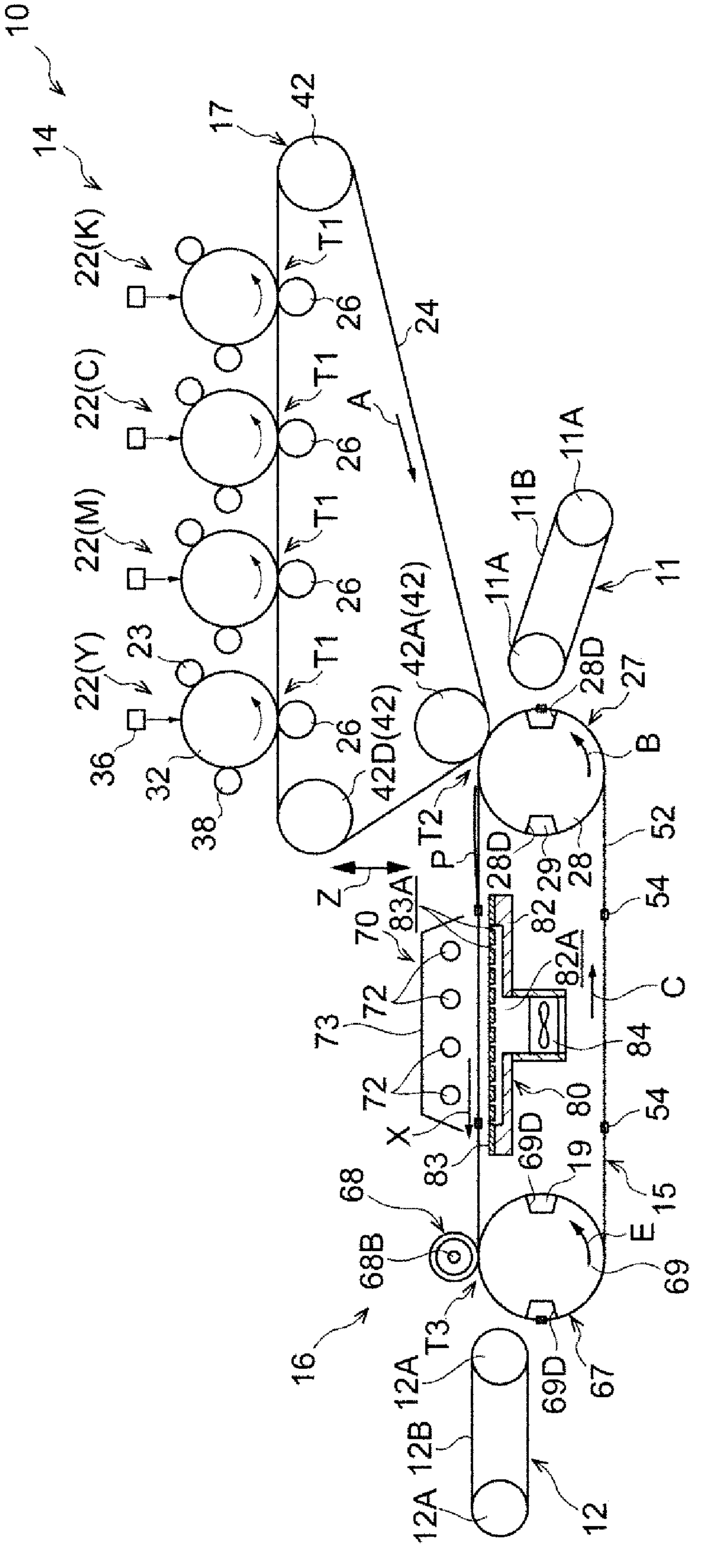
FIG. 1 is a schematic diagram showing an image forming apparatus according to a present exemplary embodiment.

A configuration of the image forming apparatus 10 according to a present exemplary embodiment will be described. FIG. 1 is a schematic diagram showing the image forming apparatus 10 according to the present exemplary embodiment.

The image forming apparatus 10 shown in FIG. 1 is an example of an image forming apparatus that forms an image on a recording medium. The image forming apparatus 10 is an electrophotographic image forming apparatus that forms a toner image (an example of an image) on a recording medium P such as a sheet. Specifically, the image forming apparatus 10 includes an image forming unit 14, a first transport body 11, a second transport body 12, and a fixing device 16. Hereinafter, a configuration of each part (the image forming unit 14, the first transport body 11, the second transport body 12, and the fixing device 16) of the image forming apparatus 10 will be described.

(Image Forming Unit 14)

The image forming unit 14 is an example of a forming unit that forms an image on the recording medium. The image forming unit 14 has a function of forming the toner image on the recording medium P serving as an example of a transported material. Specifically, the image forming unit 14 includes a toner image forming unit 22 and a transfer device 17.

(Toner Image Forming Unit 22)

The toner image forming unit 22 shown in FIG. 1 has a function of forming the toner image. Plural toner image forming units 22 form the toner image for each color. In the present exemplary embodiment, toner image forming units 22 of a total of four colors of yellow (Y), magenta (M), cyan (C), and black (K) are provided. The (Y), (M), (C), and (K) shown in FIG. 1 indicate constituent portions corresponding to the respective colors.

The toner image forming unit 22 of each color is similarly configured except for a toner to be used. Each part of the toner image forming unit 22(Y) is denoted by a reference sign in FIG. 1 as a representative of the toner image forming unit 22 of each color.

Specifically, the toner image forming unit 22 of each color includes a photoconductor drum 32 (photoconductor) that rotates in one direction (for example, in a counterclockwise direction in FIG. 1). The toner image forming unit 22 of each color includes a charger 23, an exposure device 36, and a developing device 38.

In the toner image forming unit 22 of each color, the charger 23 charges the photoconductor drum 32. The exposure device 36 exposes the photoconductor drum 32 charged by the charger 23 to form an electrostatic latent image on the photoconductor drum 32. The developing device 38 develops the electrostatic latent image, which is formed on the photoconductor drum 32 by the exposure device 36, to form a toner image.

(Transfer Device 17)

The transfer device 17 shown in FIG. 1 is a device that transfers the toner image formed by the toner image forming unit 22 onto the recording medium P. The transfer device 17 superimposes and primarily transfers the toner image of the photoconductor drum 32 of the each color onto a transfer belt 24 serving as an intermediate transfer body, and secondarily transfers the superimposed toner image onto the recording medium P at a secondary transfer position T2. Specifically, as shown in FIG. 1, the transfer device 17 includes the transfer belt 24, primary transfer rollers 26, a secondary transfer body 27, and a facing roller 42A.

(Primary Transfer Roller 26)

Each of the primary transfer rollers 26 shown in FIG. 1 is a roller that transfers the toner image of the photoconductor drum 32 of each color to the transfer belt 24 at a primary transfer position T1 between the photoconductor drum 32 and the primary transfer roller 26. In the present exemplary embodiment, by applying a primary transfer electric field between the primary transfer roller 26 and the photoconductor drum 32, the toner image formed on the photoconductor drum 32 is transferred to the transfer belt 24 at the primary transfer position T1.

(Transfer Belt 24)

The toner image is transferred from the photoconductor drum 32 of each color to an outer circumferential surface of the transfer belt 24 shown in FIG. 1. Specifically, the transfer belt 24 is configured as follows. As shown in FIG. 1, the transfer belt 24 has an annular shape. Further, the transfer belt 24 is wound around plural rollers 42 including a driving roller 42D and the facing roller 42A to determine a posture of the transfer belt 24. For example, among the plural rollers 42, the driving roller 42D is driven to rotate by a driving unit (not shown), so that the transfer belt 24 circulates in a predetermined arrow A direction.

(Secondary Transfer Body 27 and Facing Roller 42A)

Figure 2:
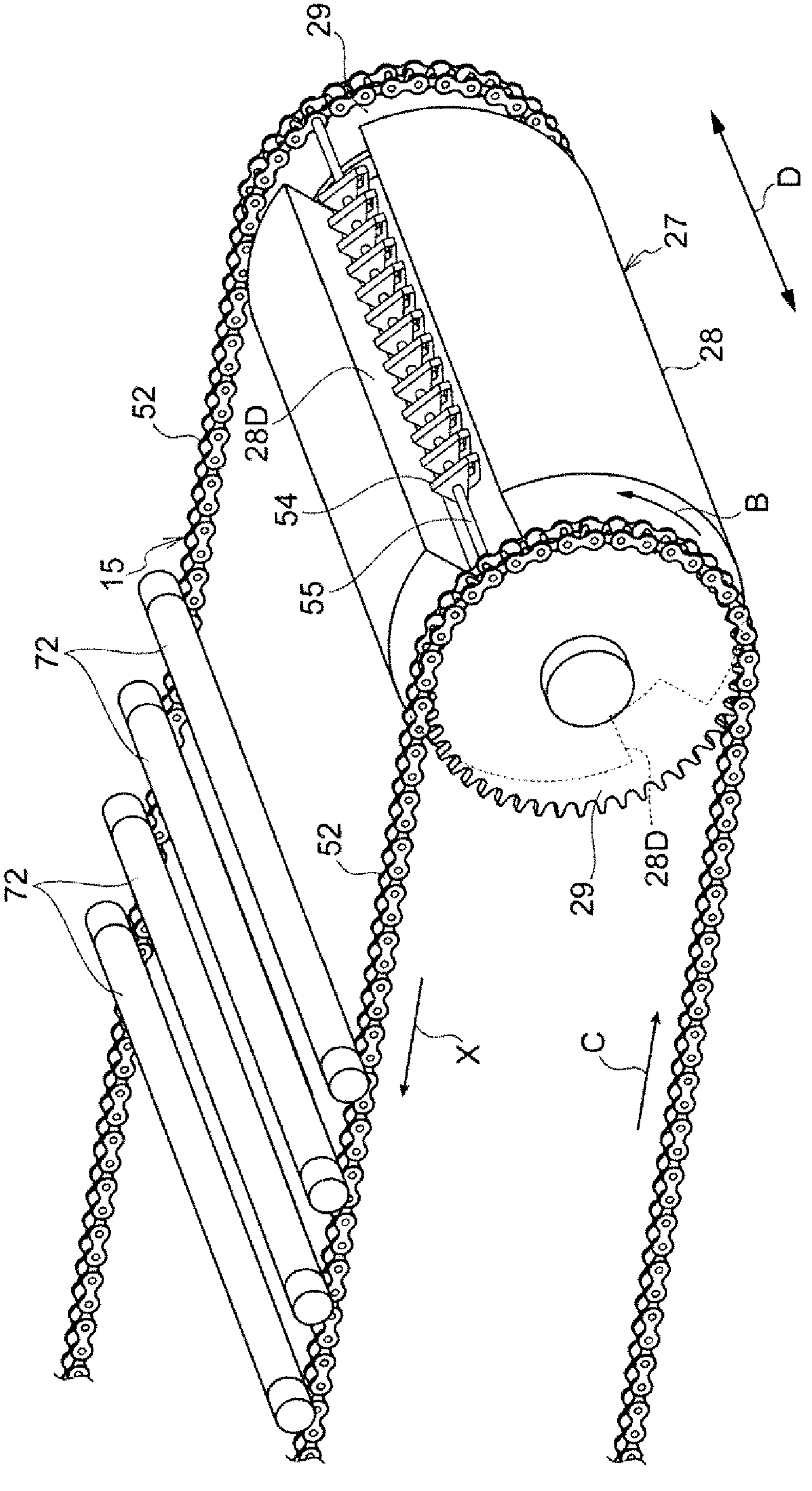
FIG. 2 is a perspective view showing a part of a secondary transfer body and a transport unit according to the present exemplary embodiment.

The secondary transfer body 27 shown in FIG. 1 has a function of transferring the toner image onto the recording medium P. Specifically, as shown in FIG. 2, the secondary transfer body 27 includes a transfer cylinder 28 and a pair of sprockets 29. The secondary transfer body 27 is driven to rotate in an arrow B direction by a driving unit (not shown).

As shown in FIG. 1, the transfer cylinder 28 and the facing roller 42A face each other with the transfer belt 24 interposed between the transfer cylinder 28 and the facing roller 42A. In the present exemplary embodiment, the secondary transfer position T2 at which the toner image is transferred from the transfer belt 24 to the recording medium P is formed between the transfer cylinder 28 and the facing roller 42A. When a secondary transfer electric field is applied between the transfer cylinder 28 and the facing roller 42A, the toner image primarily transferred to the transfer belt 24 is transferred to the recording medium P at the secondary transfer position T2.

As shown in FIG. 2, plural (specifically, two) recessed portions 28D, in which a gripper 54 and an attachment member 55 of a transport unit 15 to be described later are accommodated, are formed on an outer circumference of the transfer cylinder 28. The number of the recessed portions 28D is determined according to an arrangement interval of grippers 54 along a circulation direction C of a chain 52 to be described later. The number of the recessed portions 28D may be one, or may be three or more.

As shown in FIG. 2, the pair of sprockets 29 are disposed on both end sides in an axial direction of the transfer cylinder 28, and a pair of chains 52, which will be described later, are wound around the sprockets 29. The pair of sprockets 29 are disposed coaxially with the transfer cylinder 28 and rotate integrally with the transfer cylinder 28.

(First Transport Body 11 and Second Transport Body 12)

The first transport body 11 shown in FIG. 1 is a transport body that transports the recording medium P to the transport unit 15 to be described later. Specifically, the first transport body 11 has a function of transporting the recording medium P and transferring the recording medium P to the gripper 54 of the transport unit 15 to be described later. More specifically, the first transport body 11 is formed with an annular transport belt 11B wound around a pair of rollers 11A.

The second transport body 12 shown in FIG. 1 is a transport body that transports the recording medium P transported from the transport unit 15 to be described later. The second transport body 12 has a function of receiving the recording medium P from which holding by the gripper 54 of the transport unit 15 to be described later is released, and transporting the recording medium P. Specifically, the second transport body 12 is formed with an annular transport belt 12B wound around a pair of rollers 12A.

(Fixing Device 16)

The fixing device 16 shown in FIG. 1 is an example of a heating device that heats the recording medium on which an image is formed by the forming unit. The fixing device 16 is a device that fixes the toner image transferred to the recording medium P by the transfer cylinder 28 to the recording medium P. Specifically, as shown in FIG. 1, the fixing device 16 includes a heating unit 70, a blower unit 80, a pressurizing body 67, a heating roller 68, the transport unit 15, and a shielding plate 90 (see FIG. 6).

(Pressurizing Body 67)

Figure 3:
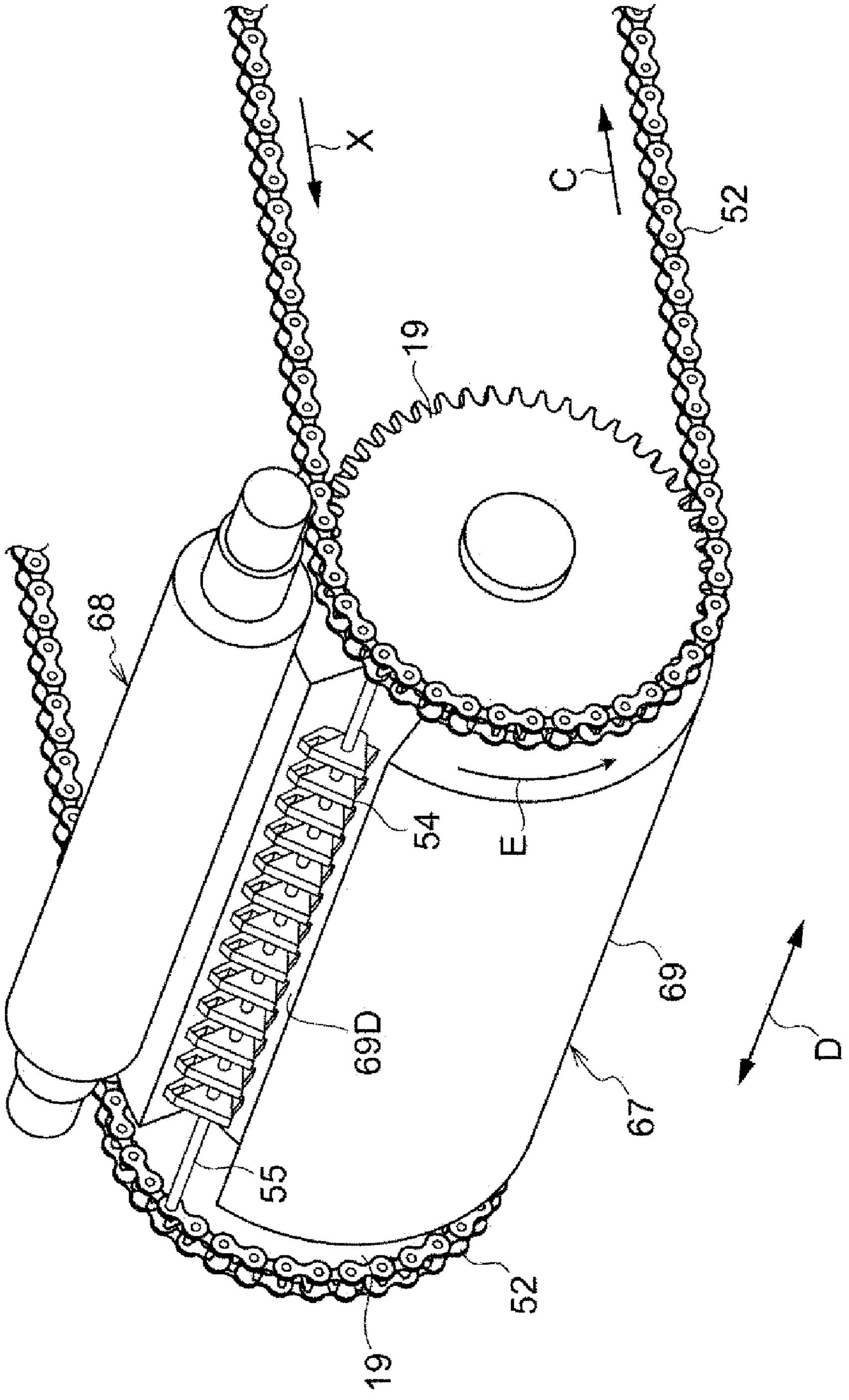
FIG. 3 is a perspective view showing a part of a pressurizing body, a heating roller, and the transport unit according to the present exemplary embodiment.

As shown in FIG. 3, the pressurizing body 67 includes a pressurizing roller 69 and a pair of sprockets 19. The pressurizing body 67 is driven to rotate in an arrow E direction by a driving unit (not shown).

The pressurizing roller 69 has a function of pressurizing the recording medium P by sandwiching the recording medium P between the pressurizing roller 69 and the heating roller 68. Plural (specifically, two) recessed portions 69D in which the gripper 54 and the attachment member 55 of the transport unit 15 are accommodated are formed on an outer circumference of the pressurizing roller 69. The number of the recessed portions 69D is determined according to the arrangement interval of the gripper 54 along the circulation direction C of the chain 52 to be described later. The number of the recessed portions 69D may be one, or may be three or more.

As shown in FIG. 3, the pair of sprockets 19 are disposed on both end sides in an axial direction of the pressurizing roller 69, and the pair of chains 52, which will be described later, are wound around the pair of sprockets 19. The pair of sprockets 19 are disposed coaxially with the pressurizing roller 69, and rotate integrally with the pressurizing roller 69.

(Heating Roller 68)

The heating roller 68 has a function of heating the recording medium P. The heating roller 68 includes a heat source 68B such as a halogen lamp. The heating roller 68 heats the toner image by sandwiching the recording medium P between the heating roller 68 and the pressurizing roller 69, and fixes the toner image on the recording medium P.

(Transport Unit 15)

The transport unit 15 shown in FIG. 1 has a function of transporting the recording medium P in a transport direction X (an arrow X direction). The transport unit 15 has a function of transporting the recording medium P from the secondary transfer position T2 to a fixing position T3 between the heating roller 68 and the pressurizing roller 69. The transport direction X is a leftward direction in FIG. 1.

Figure 5:
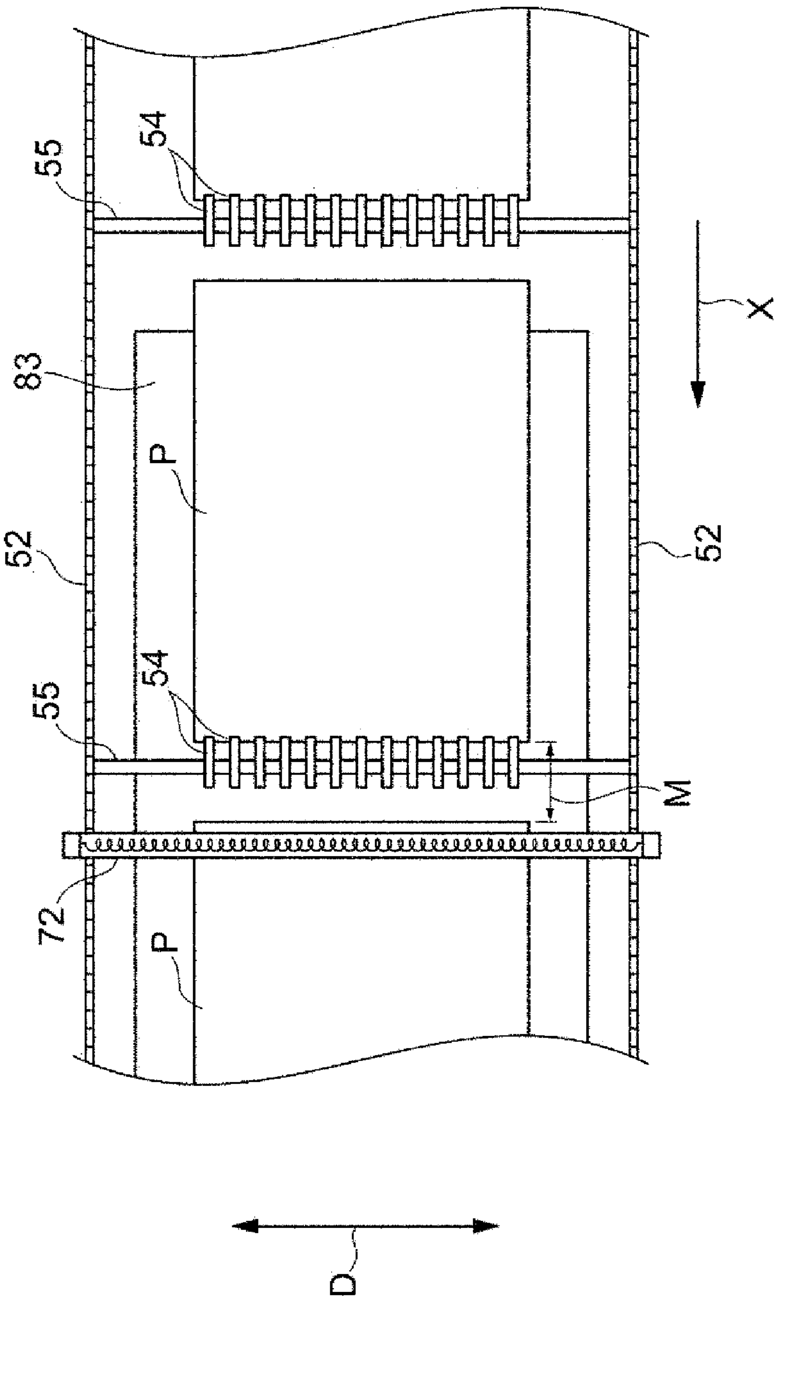
FIG. 5 is a plan view showing a part of a blower plate and the transport unit according to the present exemplary embodiment.

Specifically, as shown in FIGS. 2 and 3, the transport unit 15 includes the pair of chains 52 and the gripper 54. The gripper 54 is an example of a holder that holds the transported material. The pair of chains 52 are an example of a circulating portion to which the holder is attached and which transports the transported material by its own circulation. In FIG. 1, the chains 52 and the gripper 54 are shown in a simplified manner. In FIG. 5, the chains 52 are shown in a simplified manner.

As shown in FIG. 1, the pair of chains 52 are formed in an annular shape. As shown in FIGS. 2 and 3, the pair of chains 52 are disposed at an interval in a device depth direction D. Each of the pair of chains 52 is wound around the pair of sprockets 29 (see FIG. 2) of the secondary transfer body 27 and the pair of sprockets 19 (see FIG. 3) of the pressurizing body 67. When the secondary transfer body 27 having the pair of sprockets 29 and the pressurizing body 67 having the pair of sprockets 19 rotate, the chains 52 circulate in the circulation direction C (an arrow C direction in FIGS. 1 to 3).

Figure 4:
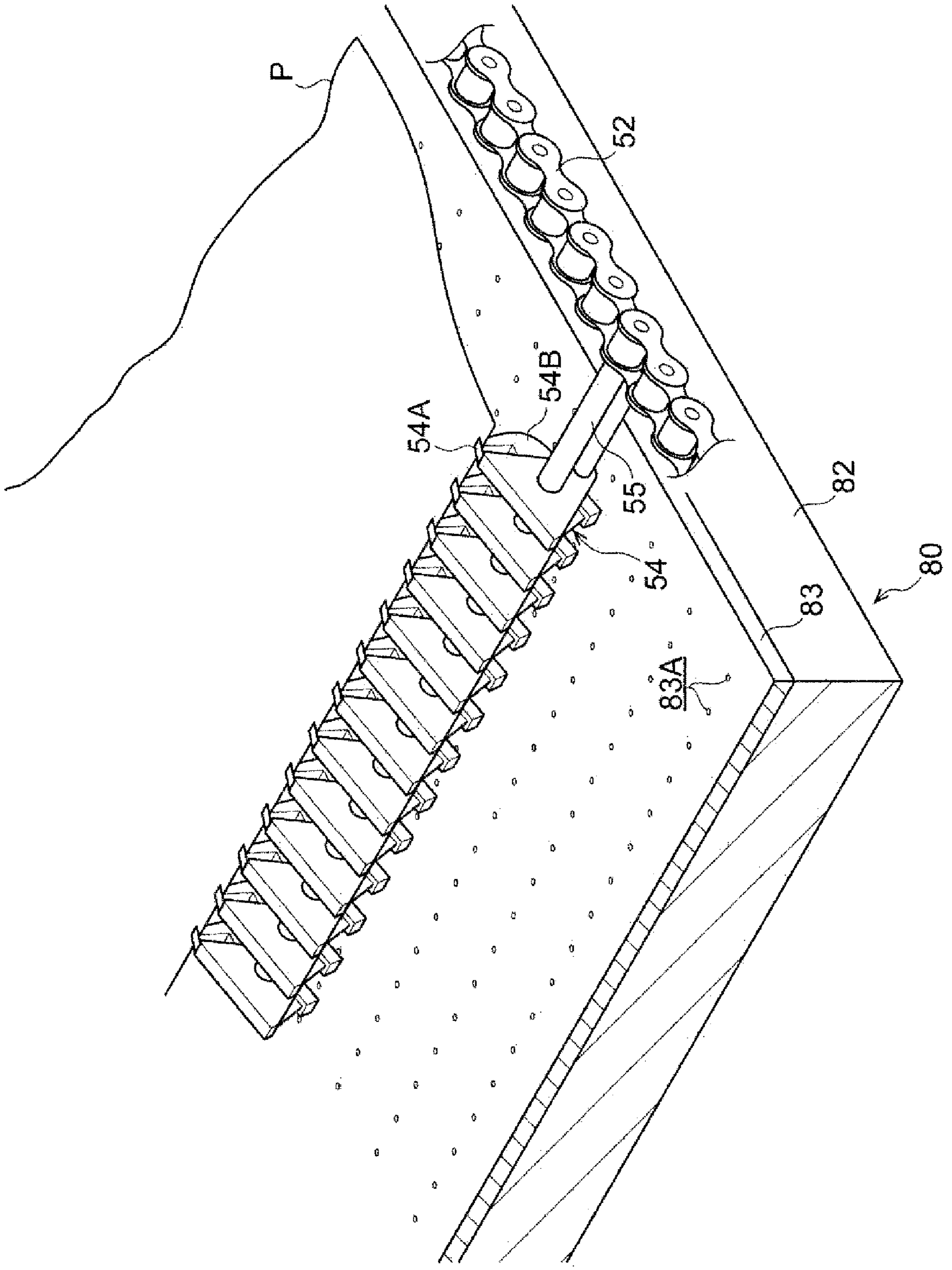
FIG. 4 is a perspective view showing a gripper according to the present exemplary embodiment.

As shown in FIGS. 2, 3 and 4, plural attachment member 55 to which the grippers 54 are attached are stretched across the pair of chains 52 along the device depth direction D. The attachment members 55 are fixed to the pair of chains 52 at predetermined intervals along a circumferential direction (circulation direction C) of the chains 52.

Plural grippers 54 are attached to the attachment members 55 at predetermined intervals along the device depth direction D. In other words, the grippers 54 are attached to the chains 52 via the attachment members 55. The gripper 54 has a function of holding a front end portion of the recording medium P. As shown in FIG. 4, the gripper 54 includes a claw 54A and a claw base 54B. The gripper 54 is configured to hold the recording medium P by sandwiching the front end portion of the recording medium P between the claw 54A and the claw base 54B. In other words, it can be said that the gripper 54 is a gripping portion that grips the recording medium P in a thickness direction. The front end portion of the recording medium P is a downstream end portion of the recording medium P in the transport direction X.

Specifically, the gripper 54 holds the front end portion of the recording medium P outside an image region of the recording medium P. The image region of the recording medium P is a region onto which the toner image is transferred in the recording medium P. In the gripper 54, for example, the claw 54A is pressed against the claw base 54B by a spring or the like, and the claw 54A is opened and closed with respect to the claw base 54B by action of a cam or the like.

The transport unit 15 holds the front end portion of the recording medium P sent from the first transport body 11 by the gripper 54 as shown in FIG. 4. As shown in FIG. 1, in the transport unit 15, the chain 52 circulates in the circulation direction C in a state where the gripper 54 holds the front end portion of the recording medium P, so that the gripper 54 is moved to transport the recording medium P. The transport unit 15 causes the recording medium P and the gripper 54 to pass through the secondary transfer position T2 while holding the recording medium P by the gripper 54. In a portion where the chain 52 is wound around the sprocket 29, the gripper 54 moves integrally with the transfer cylinder 28 in a rotation direction (B direction) of the transfer cylinder 28 in a state where the gripper 54 is accommodated in the recessed portion 28D of the transfer cylinder 28.

Further, after causing the recording medium P to pass through the secondary transfer position T2, the transport unit 15 further causes both the gripper 54 and the recording medium P to pass through the fixing position T3 while holding the recording medium P by the gripper 54. In a portion where the chain 52 is wound around the sprocket 19, the gripper 54 moves integrally with the pressurizing roller 69 in a rotation direction (E direction) of the pressurizing roller 69 in a state where the gripper 54 is accommodated in the recessed portion 69D of the pressurizing roller 69.

(Heating Unit 70)

The heating unit 70 shown in FIG. 1 has a function of heating the recording medium P transported in the transport direction X by the transport unit 15 in a non-contact manner. The heating unit 70 preheats an unfixed toner image formed on a surface of the recording medium P in the non-contact manner. Specifically, the heating unit 70 includes a heater 72 and a reflection plate 73.

The heater 72 is an example of a heating part configured to, with respect to the transported material being transported in the transport direction, heat the transported material in the non-contact manner. The heater 72 is a heating member that heats the recording medium P in the non-contact manner with respect to the recording medium P being transported in the transport direction X by the transport unit 15. Specifically, the heater 72 is configured as follows.

Figure 6:
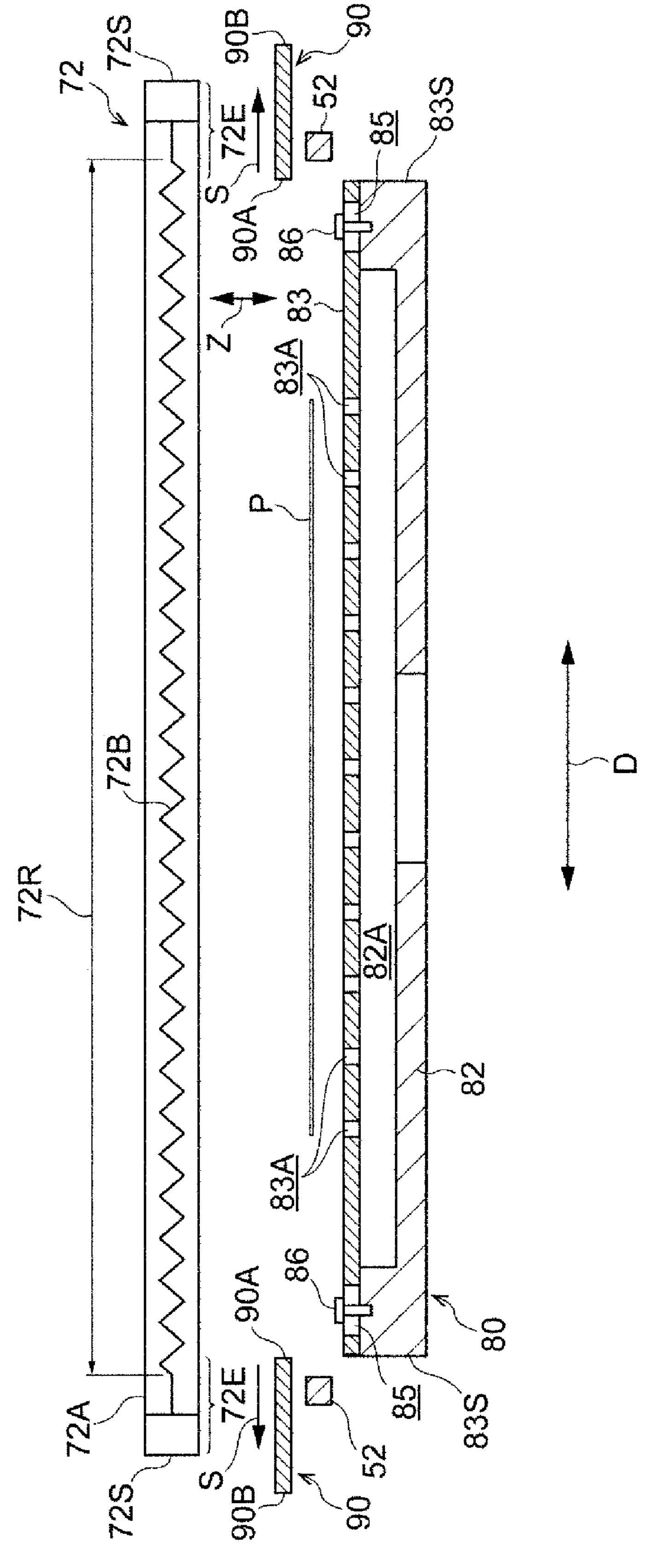
FIG. 6 is a side cross-sectional view showing a heater, a blower unit, and a shielding plate according to the present exemplary embodiment.

As shown in FIG. 2, plural heaters 72 are disposed at intervals along the transport direction X. The heater 72 is formed of a columnar infrared heater having a length in the device depth direction D. Specifically, as shown in FIG. 6, the heater 72 has a cylindrical glass tube 72A and a filament 72B accommodated inside the glass tube 72A. The heater 72 generates heat by the filament 72B, and heats the recording medium P by radiant heat of the filament 72B. In the present exemplary embodiment, as shown in FIGS. 1 and 2, four heaters 72 are provided, but the number of heaters 72 is not limited to four.

The reflection plate 73 has a function of reflecting infrared rays from the heater 72 to a device lower side (that is, a side of the recording medium P transported by the transport unit 15). The reflection plate 73 is formed in a box shape with the device lower side opened. The reflection plate 73 is formed using a metal plate such as an aluminum plate.

In the present exemplary embodiment, the heater 72 is described as an example of the heating part, but the heating unit 70 may be grasped as an example of the heating part.

(Blower Unit 80)

The blower unit 80 shown in FIG. 1 faces the heating unit 70 in an upper-lower direction Z on a side (that is, a lower side) opposite to a heating unit 70 side (that is, an upper side) with respect to the recording medium P transported by the transport unit 15.

The blower unit 80 has a function of blowing air to a lower surface of the recording medium P transported by the transport unit 15. Specifically, the blower unit 80 has a function of maintaining a non-contact state with the recording medium P by floating the recording medium P by blowing air to the recording medium P such that the recording medium P is transported by the transport unit 15 with the blower unit 80 in the non-contact state with a back surface on a side opposite to the surface of the recording medium P on which an unfixed image is formed.

The blower unit 80 includes a main body 82, a blower plate 83 serving as a blowing member, and a blower 84. The main body 82 has a space 82A inside that opens upward.

The blower 84 is provided at a lower portion of the main body 82. The blower 84 sends air to the space 82A of the main body 82. As an example, an axial-flow blower that blows air in an axial direction is used as the blower 84. As the blower 84, a centrifugal blower that blows air in a centrifugal direction, such as a multi-blade blower (for example, a sirocco fan), may be used.

The blower plate 83 is an example of a facing portion that is on a side opposite to a heating part side with respect to the transported material and faces the heating part in a facing direction intersecting the transport direction. Specifically, the blower plate 83 faces the heating unit 70 in the upper-lower direction Z on the side (that is, the lower side) opposite to the heating unit 70 side (that is, the upper side) with respect to the recording medium P transported by the transport unit 15. The upper-lower direction Z is an example of the facing direction intersecting the transport direction X.

Specifically, as shown in FIG. 6, the blower plate 83 is a plate-shaped member made of metal or resin, and has plural blower holes 83A penetrating in the upper-lower direction Z. The blower hole 83A is an example of a blower port for blowing air to the transported material. The blower port may be a single blower port. The blower plate 83 is attached to the main body 82 so as to be movable in the device depth direction D. Specifically, for example, the blower plate 83 is attached to an upper portion of the main body 82 by a pin 86 passing through a long hole 85 that is formed in the blower plate 83 and is long in the device depth direction D. Accordingly, the blower plate 83 is movable with respect to the main body 82 in a range in which the pin 86 moves in the long hole 85 in the device depth direction D. As a result, extension of the blower plate 83 in the device depth direction D due to thermal expansion is absorbed.

By passing air sent from the blower 84 to the space 82A of the main body 82 upward through the plural blower holes 83A to be applied to the lower surface of the recording medium P, the blower plate 83 causes the recording medium P to float.

In the present exemplary embodiment, the blower plate 83 is described as an example of the facing portion, but the blower unit 80 may be grasped as an example of the facing portion.

(Lengths of Blower Plate 83 and Heater 72 and Positional Relationship Between Blower Plate 83 and Heater 72)

As shown in FIGS. 5 and 6, the length of the heater 72 in the device depth direction D is longer than the length of the blower plate 83 in the device depth direction D. Specifically, a length of the heater 72 in the device depth direction D in a heating region 72R of the heater 72 is longer than the length of the blower plate 83 in the device depth direction D. The device depth direction D is an example of an intersecting direction intersecting the transport direction X and the upper-lower direction (an example of the facing direction).

The heating region 72R of the heater 72 is a portion that generates heat in the heater 72. In the present exemplary embodiment, the heating region 72R of the heater 72 corresponds to an arrangement portion in which the filament 72B is disposed. A length of the filament 72B is shorter than a length of the glass tube 72A.

Further, both end portions of the heater 72 in the device depth direction D protrude with respect to the blower plate 83 in the device depth direction D. Specifically, both end portions of the heater 72 in the device depth direction D in the heating region 72R of the heater 72 protrude with respect to the blower plate 83 in the device depth direction D. In other words, the heater 72 has a protruding portion 72E protruding with respect to the blower plate 83 in the device depth direction D. In the present exemplary embodiment, the heater 72 has protruding portions 72E at the both end portions in the device depth direction D. Each protruding portion 72E is disposed above the chain 52.

(Shielding Plate 90)

The shielding plate 90 is an example of a shielding portion that shields heat of the heating part. Specifically, the shielding plate 90 is provided between the chain 52 (an example of a component) disposed below the protruding portion 72E of the heater 72 and the protruding portion 72E of the heater 72. The shielding plate 90 shields heat of the heater 72 between the protruding portion 72E of the heater 72 and the chain 52. In other words, the shielding plate 90 has a function of preventing the heat of the heater 72 from reaching the chain 52.

In FIG. 6, the chains 52 and the shielding plate 90 are shown in a simplified manner. In the present exemplary embodiment, the shielding plate 90 is disposed on an upper side with respect to the blower plate 83. In other words, the shielding plate 90 is disposed on the heating unit 70 side (that is, a heater 72 side) with respect to the blower plate 83.

Further, the shielding plate 90 is separated from the blower plate 83. Specifically, the shielding plate 90 is separated from the blower plate 83 on the upper side.

The shielding plate 90 is formed in a plate shape in which the upper-lower direction Z is the thickness direction. The shielding plate 90 protrudes outward (in an arrow S direction) from an end portion 83S of the blower plate 83 in the device depth direction D. In the device depth direction D, one end portion 90A of the shielding plate 90 in the device depth direction D is disposed at the same position as the end portion 83S of the blower plate 83 in the device depth direction D. The one end portion 90A of the shielding plate 90 in the device depth direction D may be disposed, for example, slightly outside (in the arrow S direction) with respect to the end portion 83S of the blower plate 83 in the device depth direction D, or may be disposed slightly inside (in a direction opposite to the arrow S direction) with respect to the end portion 83S of the blower plate 83 in the device depth direction D. On the other hand, the other end portion 90B of the shielding plate 90 in the device depth direction D is disposed, for example, outside (in the arrow S direction) with respect to an end portion 72S of the heater 72 in the device depth direction D. The other end portion 90B of the shielding plate 90 in the device depth direction D may be disposed outside with respect to the chain 52 and inside (in the direction opposite to the arrow S direction) with respect to the end portion 72S of the heater 72 in the device depth direction D.

A length of the shielding plate 90 in the transport direction X is, for example, longer than a length of the heating unit 70 in the transport direction X. Specifically, both end portions of the shielding plate 90 in the transport direction X protrude with respect to the heating unit 70 in the transport direction X. As the shielding plate 90, for example, a plate material made of a heat resistant material (for example, a metal material) is used.

(Operation According to Present Exemplary Embodiment)

According to the image forming apparatus 10 (see FIG. 1) according to the present exemplary embodiment, the front end portion of the recording medium P sent from the first transport body 11 is held by the gripper 54 of the transport unit 15. Further, when the chain 52 circulates in the circulation direction C in a state where the gripper 54 holds the front end portion of the recording medium P, the gripper 54 moves to transport the recording medium P, and causes the recording medium P to pass through the secondary transfer position T2. At the secondary transfer position T2, the toner image superimposed on the transfer belt 24 is transferred from the transfer belt 24 to the recording medium P.

The recording medium P to which the toner image is transferred is further transported by the transport unit 15, and passes between the heating unit 70 and the blower plate 83 of the blower unit 80. At this time, the recording medium P is transported in a floating state by air sent from the blower hole 83A of the blower plate 83. By radiant heat of the heater 72 of the heating unit 70, the unfixed image formed on the surface of the recording medium P is preheated in the non-contact manner.

The preheated recording medium P is further transported to the fixing position T3 by the transport unit 15, and is heated by the heating roller 68 and pressurized by the pressurizing roller 69. Accordingly, the toner image is fixed on the recording medium P. In the present exemplary embodiment, for example, in a gap M (see FIG. 5) between the recording medium P and the recording medium P transported by the transport unit 15, the blower plate 83 is heated by the radiant heat of the heater 72.

Here, in the present exemplary embodiment, as described above, the length of the heater 72 in the device depth direction D (an example of the intersecting direction) is longer than the length of the blower plate 83 in the device depth direction D.

Figure 7:
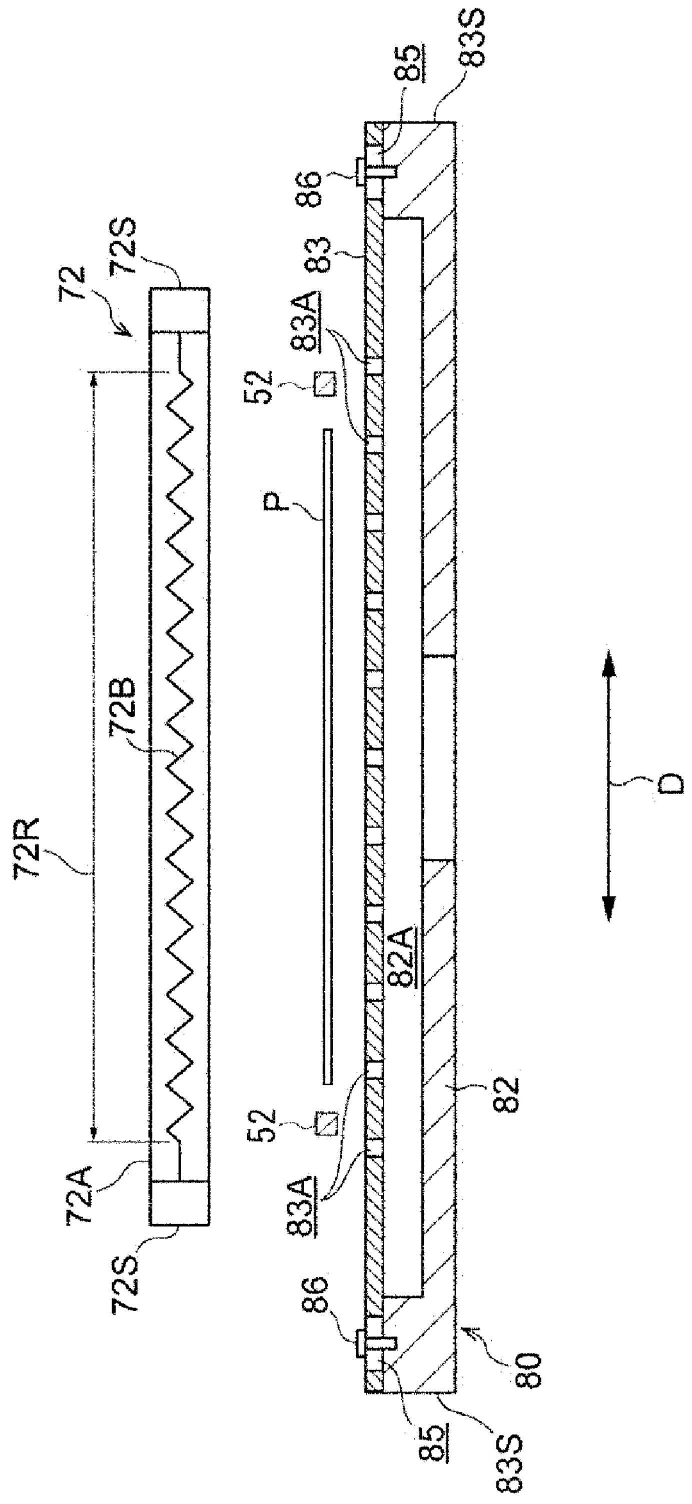
FIG. 7 is a side cross-sectional view showing the heater, the blower unit, and the shielding plate according to a first comparative example.
Figure 8:
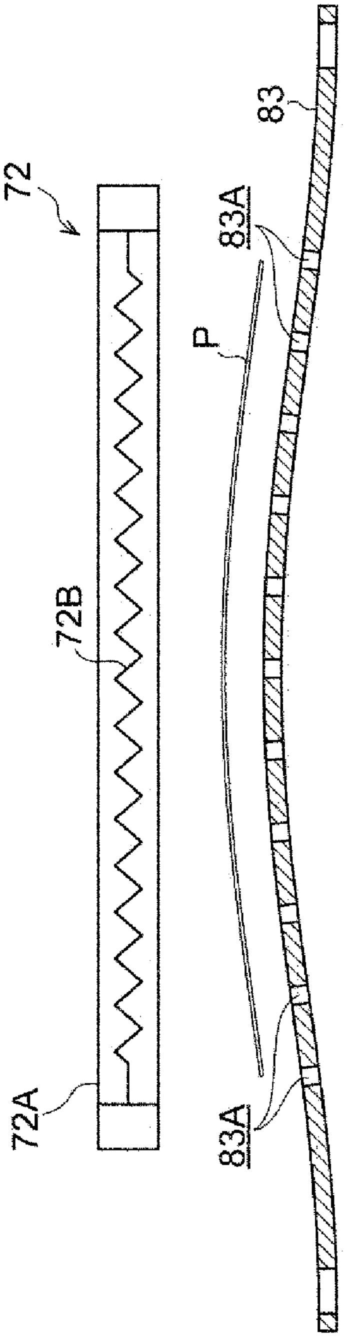
FIG. 8 is a side cross-sectional view showing a state in which the blower plate is deformed in a configuration shown in FIG. 7.

As shown in FIG. 7, in a configuration (first comparative example) in which the length of the heater 72 in the device depth direction D is equal to or less than the length of the blower plate 83 in the device depth direction D, a temperature distribution may occur in the device depth direction D in the blower plate 83 heated by the heater 72. Specifically, in the first comparative example, a heating amount is higher at a central portion than at both end portions of the blower plate 83 in the device depth direction D, and a temperature is likely to rise. In the first comparative example, since thermal expansion is larger at the central portion than the both end portions of the blower plate 83 in the device depth direction D, when a temperature difference between the central portion and the both end portions is large, as shown in FIG. 8, the blower plate 83 is easily deformed, for example, in a convex shape toward the heating unit 70 side (upper side). When the blower plate 83 is deformed in the convex shape toward the upper side, a distance between the blower plate 83 that sends air to the recording medium P and the recording medium P partially changes, and transport failure such as the recording medium P coming into contact with the blower plate 83 may occur. Further, for example, when the image forming apparatus 10 is an apparatus (refer to a modification described later) that forms an image on both surfaces of the recording medium P, an image defect due to contact of the image of the recording medium P with the blower plate 83 may occur. In FIG. 8, a deformation of the blower plate 83 is shown in an exaggerated manner. As a result of the temperature distribution occurring in the blower plate 83, for example, a case where the blower plate 83 is deformed in a convex shape toward the lower side or a case where the blower plate 83 is deformed in an uneven shape in the upper-lower direction (that is, deformed in a wavy shape) may be considered.

In contrast, in the present exemplary embodiment, as shown in FIG. 6, since the length of the heater 72 in the device depth direction D (an example of the intersecting direction) is longer than the length of the blower plate 83 in the device depth direction D, the temperature difference between the central portion and the both end portions of the blower plate 83 in the device depth direction D is smaller than that in the first comparative example. Therefore, according to a configuration of the present exemplary embodiment, the occurrence of the temperature distribution in the blower plate 83 is prevented as compared with the first comparative example. As a result, according to the configuration of the present exemplary embodiment, the deformation of the blower plate 83 due to the temperature distribution occurred in the blower plate 83 is prevented as compared with the first comparative example. Accordingly, according to the configuration of the present exemplary embodiment, the distance between the blower plate 83 that sends air to the recording medium P and the recording medium P is unlikely to change partially, and the contact of the recording medium P with the blower plate 83 is prevented as compared with the first comparative example.

As a result, according to the configuration of the present exemplary embodiment, a distance between the heater 72 and the recording medium P is also unlikely to change partially, and heating failure of the recording medium P is prevented as compared with the first comparative example.

Specifically, as shown in FIG. 6, in the present exemplary embodiment, the length of the heater 72 in the device depth direction D in the heating region 72R is longer than the length of the blower plate 83 in the device depth direction D. Therefore, as compared with a configuration in which the length of the heater 72 in the device depth direction D in the heating region 72R is equal to or less than the length of the blower plate 83 in the device depth direction D (second comparative example), the temperature difference between the central portion and the both end portions of the blower plate 83 in the device depth direction D is reduced. Therefore, according to the configuration of the present exemplary embodiment, the occurrence of the temperature distribution in the blower plate 83 is prevented as compared with the second comparative example. As a result, according to the configuration of the present exemplary embodiment, the deformation of the blower plate 83 due to the temperature distribution occurred in the blower plate 83 is prevented as compared with the second comparative example.

Further, in the present exemplary embodiment, as shown in FIG. 6, the both end portions of the heater 72 in the device depth direction D protrude with respect to the blower plate 83 in the device depth direction D. Therefore, as compared with a configuration in which the both end portions of the heater 72 in the device depth direction D are accommodated in the blower plate 83 in the device depth direction D (a third comparative example) and a configuration in which only one end portion of the heater 72 in the device depth direction D protrudes with respect to the blower plate 83 in the device depth direction D (a fourth comparative example), the temperature difference between the central portion and the both end portions of the blower plate 83 in the device depth direction D is reduced. Therefore, according to the configuration of the present exemplary embodiment, the occurrence of the temperature distribution in the blower plate 83 is prevented as compared with the third comparative example and the fourth comparative example. As a result, according to the configuration of the present exemplary embodiment, the deformation of the blower plate 83 due to the temperature distribution occurred in the blower plate 83 is prevented as compared with the third comparative example and the fourth comparative example.

Figure 9:
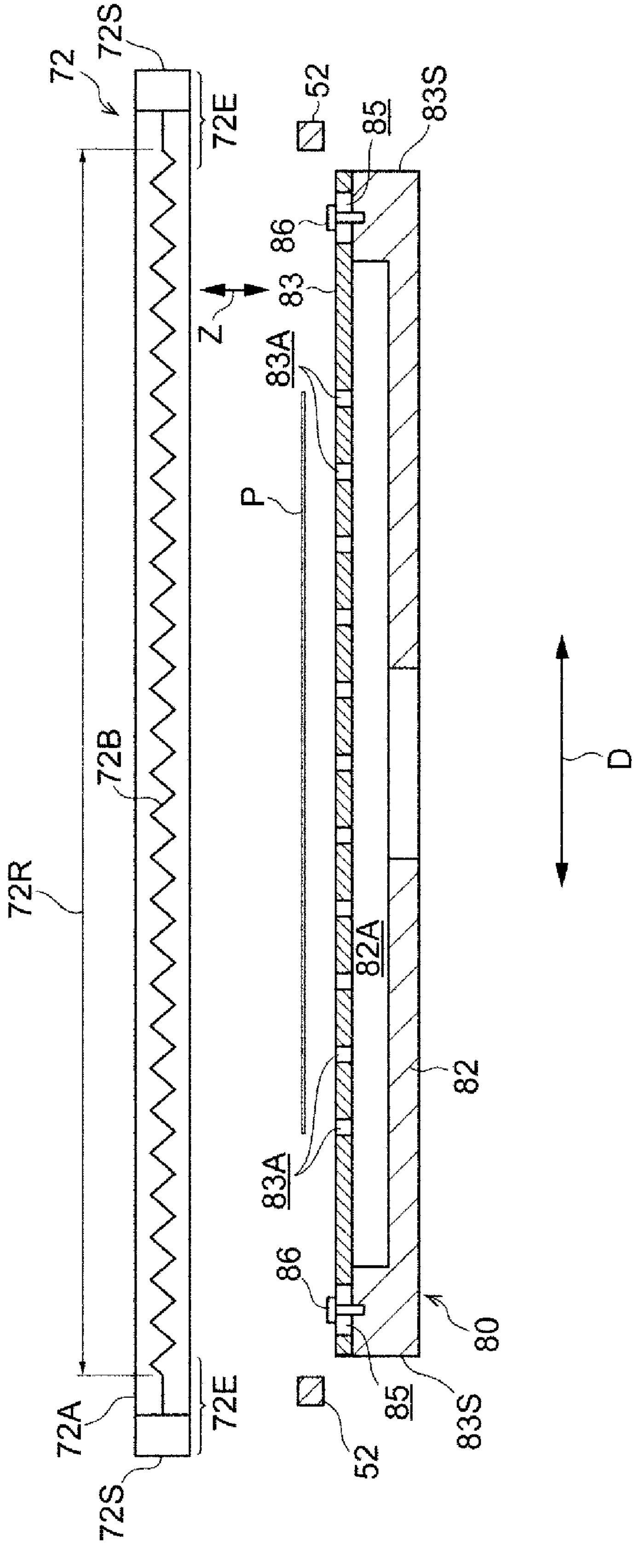
FIG. 9 is a side cross-sectional view showing the heater and the blower unit according to a fifth comparative example.

Further, in the present exemplary embodiment, as shown in FIG. 6, the shielding plate 90 shields the heat of the heater 72 between the protruding portion 72E of the heater 72 and the chain 52. Here, as shown in FIG. 9, in a configuration in which only a space is provided between the protruding portion 72E of the heater 72 and the chain 52 (a fifth comparative example), a temperature of the chain 52 may rise and the chain 52 may thermally expand. When the chain 52 thermally expands, a length of the chain 52 in the circulation direction C increases, and transport timing of the chain 52 to the secondary transfer position T2 and the fixing position T3 may vary. When a difference in thermal expansion occurs between one and the other of the pair of chains 52 and the length in the circulation direction C changes, a skew in which the recording medium P is obliquely transported may occur.

In contrast, in the present exemplary embodiment, since the shielding plate 90 shields the heat of the heater 72 between the protruding portion 72E of the heater 72 and the chain 52, a temperature rise of the chain 52 is prevented as compared with the fifth comparative example. Accordingly, according to the configuration of the present exemplary embodiment, a variation in the transport timing due to the thermal expansion of the chain 52 and an occurrence of the skew are prevented as compared with the fifth comparative example.

In the present exemplary embodiment, as shown in FIG. 6, the shielding plate 90 is separated from the blower plate 83. Therefore, heat transfer between the shielding plate 90 and the blower plate 83 is prevented as compared with a configuration in which the shielding plate 90 is in contact with the blower plate 83 (sixth comparative example). Accordingly, according to the configuration of the present exemplary embodiment, the occurrence of the temperature distribution in the blower plate 83 is prevented as compared with the sixth comparative example.

(Modification of Heating Unit 70)

Figure 10:
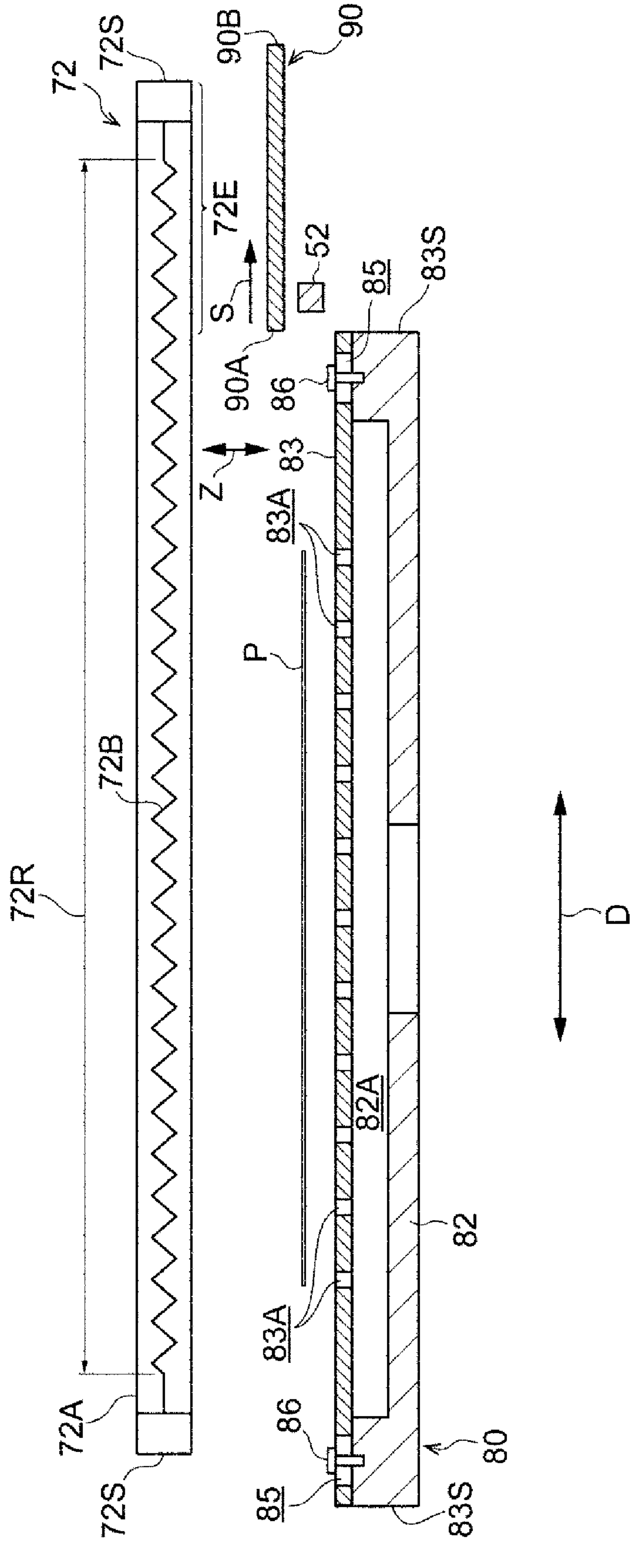
FIG. 10 is a side cross-sectional view showing the heater, the blower unit, and the shielding plate according to a first modification.

In the present exemplary embodiment, as shown in FIG. 6, the both end portions of the heater 72 in the device depth direction D protrude with respect to the blower plate 83 in the device depth direction D, but the present invention is not limited thereto. For example, as shown in FIG. 10, only one end portion of the heater 72 in the device depth direction D may be configured to protrude with respect to the blower plate 83 in the device depth direction D (first modification). According to this configuration, as compared with the configuration in which the both end portions of the heater 72 in the device depth direction D are accommodated in the blower plate 83 in the device depth direction D (third comparative example), at least a temperature difference between the one end portion of the blower plate 83 on a side where the heater 72 protrudes in the device depth direction D and the central portion of the blower plate 83 in the device depth direction D is reduced. Therefore, according to the configuration of the present exemplary embodiment, the occurrence of the temperature distribution in the blower plate 83 is prevented as compared with the third comparative example. As a result, according to the configuration of the present exemplary embodiment, the deformation of the blower plate 83 due to the temperature distribution occurred in the blower plate 83 is prevented as compared with the third comparative example.

Figure 11:
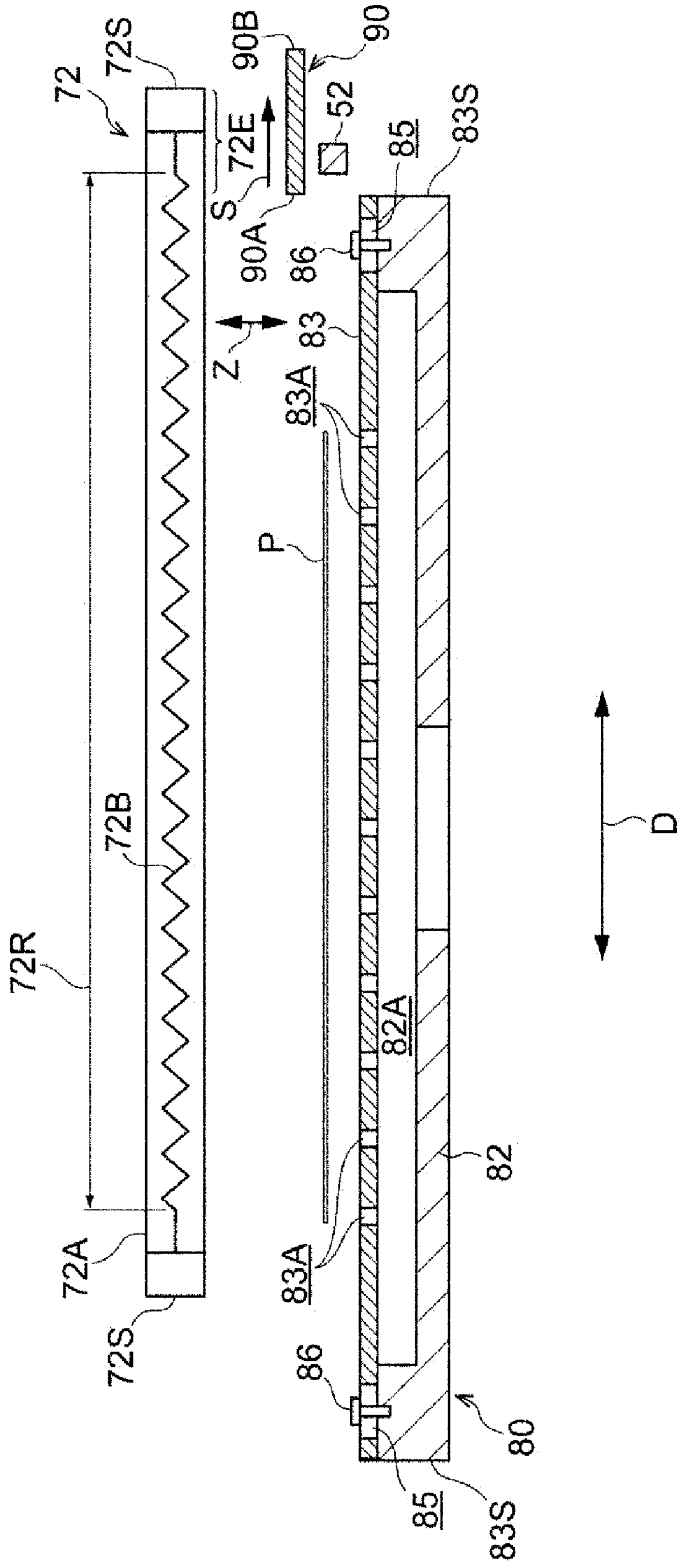
FIG. 11 is a side cross-sectional view showing a configuration in which a length of the heater in a device depth direction is equal to or less than a length of the blower plate in the device depth direction in the first modification.

In the first modification, as shown in FIG. 10, the length of the heater 72 in the device depth direction D is longer than the length of the blower plate 83 in the device depth direction D. Further, in the first modification, as shown in FIG. 11, the length of the heater 72 in the device depth direction D may be equal to or less than the length of the blower plate 83 in the device depth direction D.

Figure 12:
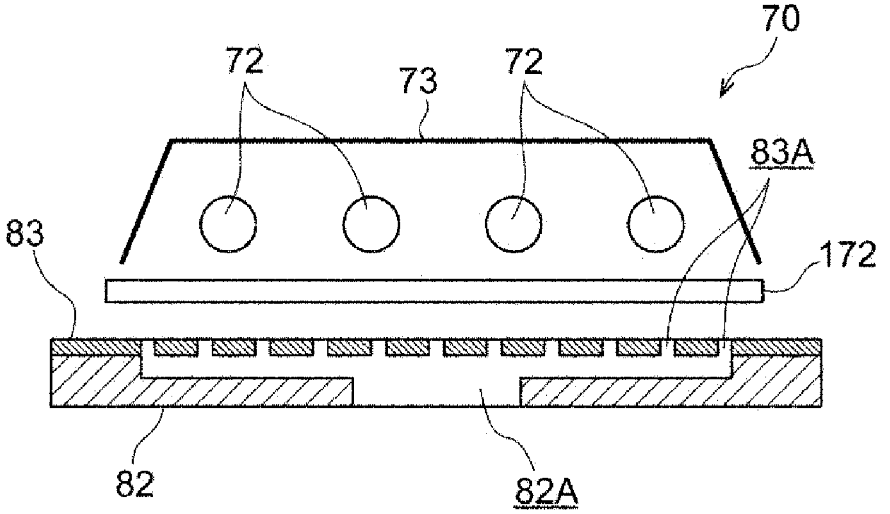
FIG. 12 is a front cross-sectional view showing the heater, the blower unit, and a heating plate according to a second modification.

In the present exemplary embodiment, as shown in FIGS. 1 and 6, the heater 72 is used as an example of the heating part, but the present invention is not limited thereto. For example, as shown in FIG. 12, a heating plate 172 disposed between the plural heaters 72 and the recording medium P transported by the transport unit 15 may be configured to be used as an example of the heating part (second modification).

In the second modification, the plural heaters 72 heat the heating plate 172, and the heating plate 172 heats the recording medium P by radiant heat. As the heating plate

Figure 13:
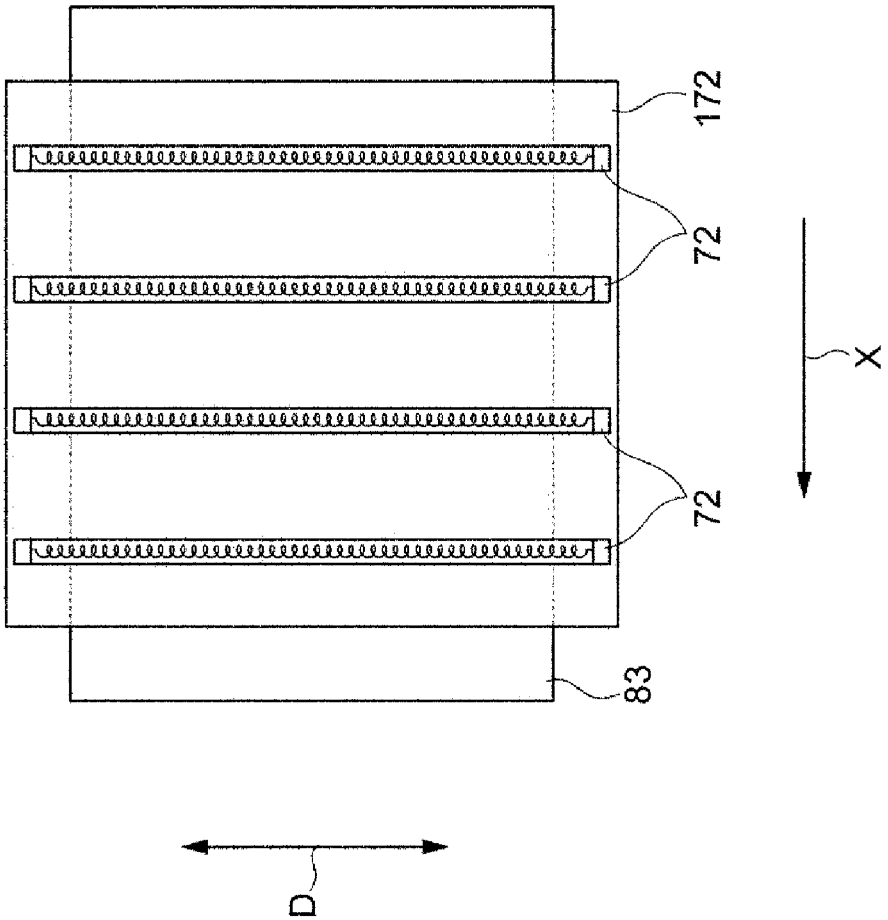
FIG. 13 is a plan view showing the heater, the blower unit, and the heating plate according to the second modification.

172, for example, a black plate is used. In the second modification, as shown in FIG. 13, a length of the heating plate 172 in the device depth direction D is longer than the length of the blower plate 83 in the device depth direction D. At least one end portion of the heating plate 172 in the device depth direction D may protrude from the blower plate 83 in the device depth direction D.

In the second modification, the length of the heater 72 in the device depth direction D may not be longer than the length of the blower plate 83 in the device depth direction D. An end portion of the heater 72 in the device depth direction D may not protrude with respect to the blower plate 83 in the device depth direction D.

Figure 14:
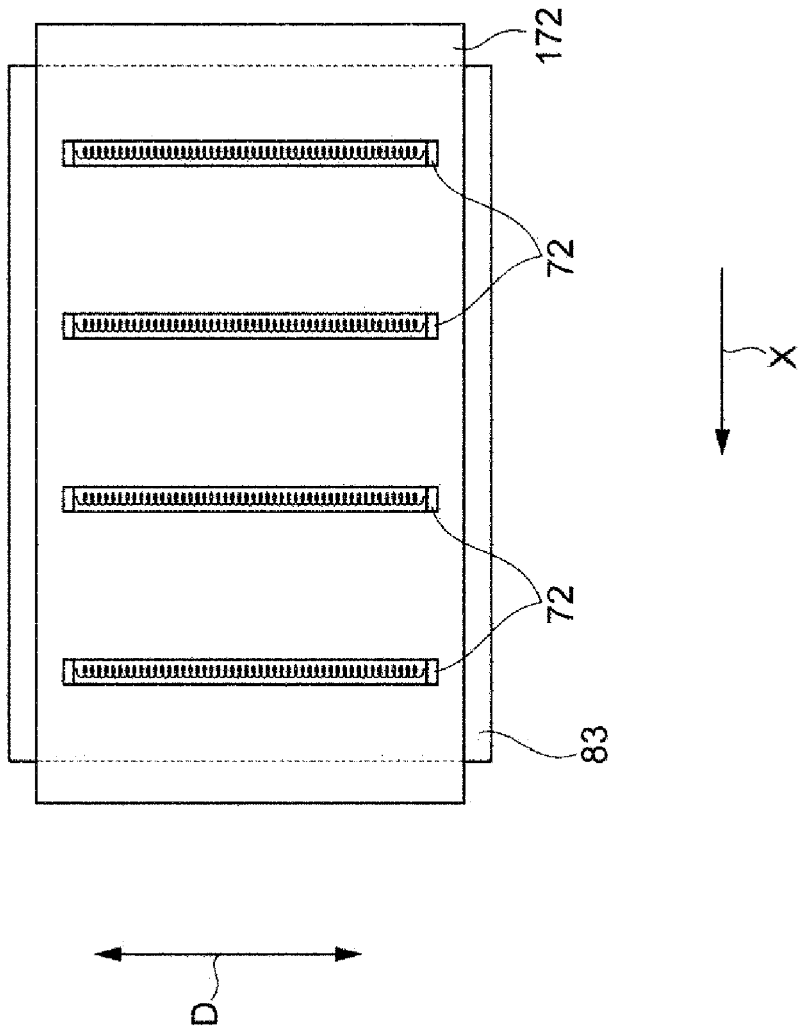
FIG. 14 is a plan view showing a configuration in which a length of the heating plate in a transport direction is longer than a length of the blower plate in the transport direction in the second modification.

In the second modification, as shown in FIG. 14, instead of making the length of the heating plate 172 in the device depth direction D longer than the length of the blower plate 83 in the device depth direction D, a length of the heating plate 172 in the transport direction X may be longer than a length of the blower plate 83 in the transport direction X.

Figure 15:
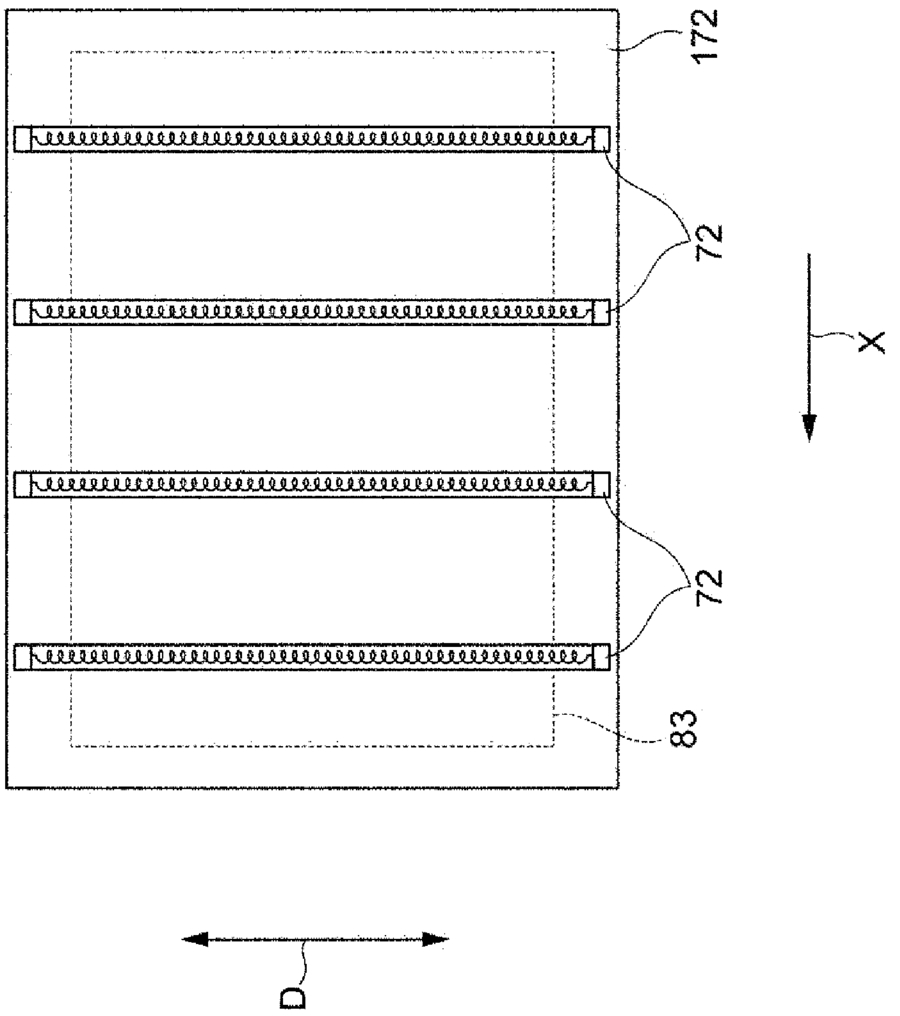
FIG. 15 is a plan view showing a configuration in which a length of the heating plate in the device depth direction is longer than the length of the blower plate in the device depth direction, and the length of the heating plate in the transport direction is longer than the length of the blower plate in the transport direction in the second modification.

Further, in the second modification, as shown in FIG. 15, in addition to making the length of the heating plate 172 in the device depth direction D longer than the length of the blower plate 83 in the device depth direction D, the length of the heating plate 172 in the transport direction X may be longer than the length of the blower plate 83 in the transport direction X.

In other words, in a configuration using the heating plate 172, the length of the heating plate 172 in the device depth direction D may be longer than the length of the blower plate 83 in the device depth direction D, and the length of the heating plate 172 in the transport direction X may be longer than the length of the blower plate 83 in the transport direction X.

In the second modification, by adopting a configuration in which the length of the heating plate 172 in the transport direction X is longer than the length of the blower plate 83 in the transport direction X, a temperature difference between a central portion and both end portions of the blower plate 83 in the transport direction X is smaller than a configuration in which the length of the heating plate 172 in the transport direction X is equal to or less than the length of the blower plate 83 in the transport direction X (seventh comparative example). Therefore, according to the configuration of the present exemplary embodiment, the occurrence of the temperature distribution in the blower plate 83 is prevented as compared with the seventh comparative example.

Further, in the configuration using the heating plate 172, instead of or in addition to making at least one end portion of the heating plate 172 in the device depth direction D protrude with respect to the blower plate 83 in the device depth direction D, at least one end portion of the heating plate 172 in the transport direction X may protrude with respect to the blower plate 83 in the transport direction X. In other words, in the configuration using the heating plate 172, at least one end portion of the heating plate 172 in the device depth direction D may protrude with respect to the blower plate 83 in the device depth direction D, or at least one end portion of the heating plate 172 in the transport direction X may protrude with respect to the blower plate 83 in the transport direction X.

In the second modification, by adopting the configuration in which at least one end portion of the heating plate 172 in the transport direction X protrudes with respect to the blower plate 83 in the transport direction X, the temperature difference between the central portion and the both end portions of the blower plate 83 in the transport direction X is smaller than a configuration in which both end portions of the heating plate 172 in the transport direction X are accommodated in the blower plate 83 in the transport direction X (eighth comparative example). Therefore, according to the configuration of the present exemplary embodiment, the occurrence of the temperature distribution in the blower plate 83 is prevented as compared with the eighth comparative example.

(Modification of Shielding Plate 90)

In the present exemplary embodiment, as shown in FIG. 6, the shielding plate 90 is disposed on the heater 72 side with respect to the blower plate 83, but the present invention is not limited thereto. For example, as shown in FIG. 16, the shielding plate 90 may be disposed on the side (that is, the lower side) opposite to the heater 72 side with respect to the blower plate 83 (third modification).

Figure 16:
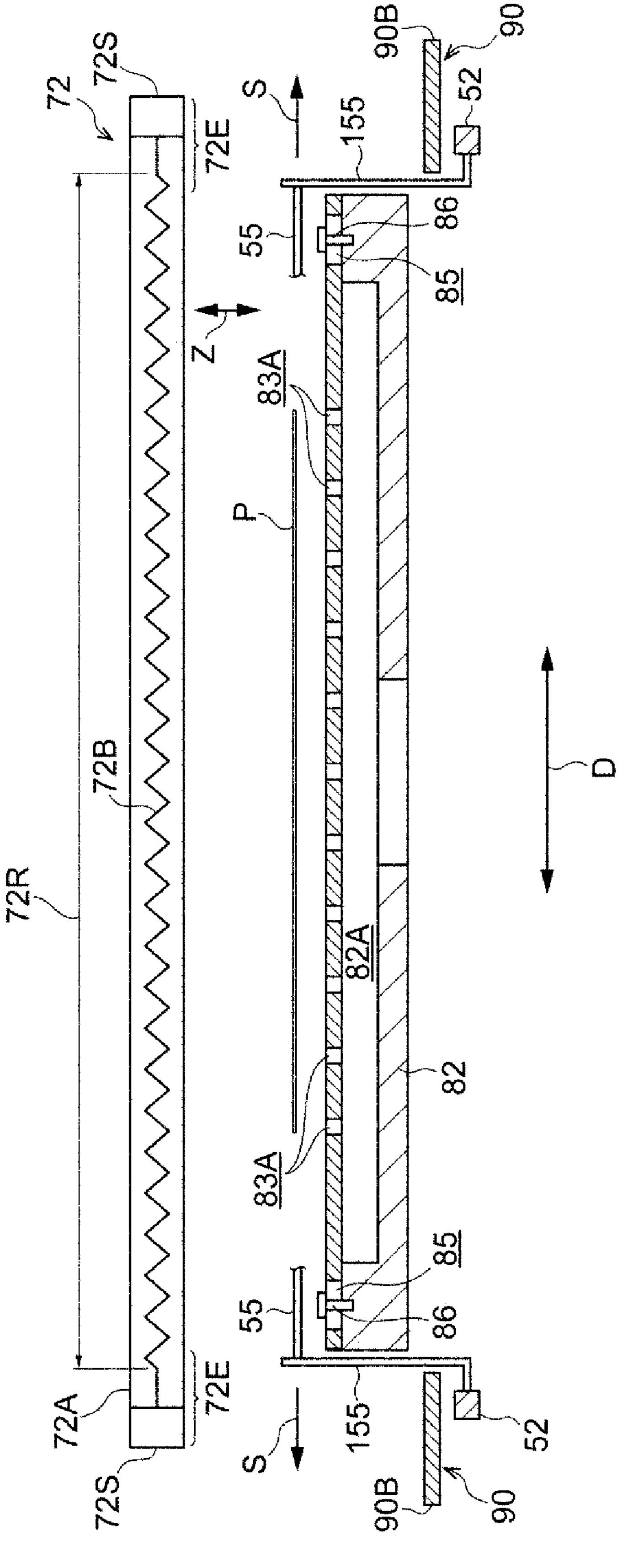
FIG. 16 is a side cross-sectional view showing the heater, the blower unit, and the shielding plate according to a fourth modification.

In the third modification, for example, the blower plate 83 may be disposed on an upper side of the chain 52, and the shielding plate 90 may be provided between the chain 52 and protruding portion 72E of the heater 72 on a lower side of the blower plate 83 and on the upper side of the chain 52 as shown in FIG. 16 (fourth modification). In the fourth modification, for example, a connecting portion 155 that connects the attachment member 55 and the chain 52 is provided. The connecting portion 155, for example, protrudes inward (in the direction opposite to the arrow S direction) from the chain 52, extends toward the upper side, and is formed in an L shape as viewed in the transport direction X.

According to a configuration of the third modification, as compared with a configuration in which the shielding plate 90 is disposed on the heater 72 side with respect to the blower plate 83 (ninth comparative example), heating of the blower plate 83 by the heater 72 is unlikely to be hindered by the shielding plate 90, so that the occurrence of the temperature distribution in the blower plate 83 is prevented.

Figure 17:
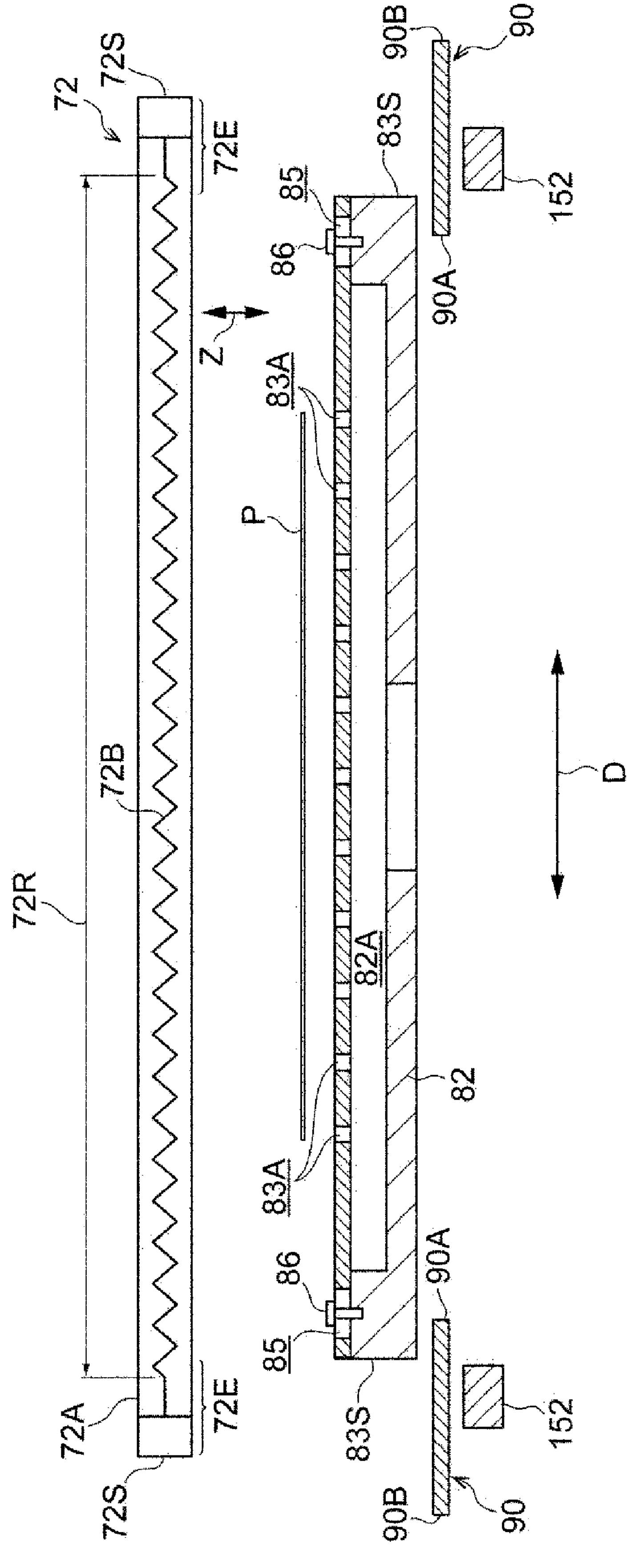
FIG. 17 is a side cross-sectional view showing the heater, the blower unit, and the shielding plate according to a fifth modification.

In the third modification, further, for example, the shielding plate 90 may be disposed between a functional component 152 different from the chain 52 and the protruding portion 72E of the heater 72 to shield the heat of the heater 72 as shown in FIG. 17 (fifth modification). The functional component 152 is a component having a low heat resistance and a specific function. Specifically, for example, a transmissive photosensor that detects a position of a component of the blower 84, the gripper 54 or the chain 52, and further, a temperature sensor that detects a temperature of the gripper 54 or the chain 52, or other temperature inside the apparatus corresponds to the functional component 152.

Further, in a configuration of the fifth modification, as shown in FIG. 17, the shielding plate 90 may overlap the blower plate 83 as viewed in the upper-lower direction Z (sixth modification). That is, in the sixth modification, one end portion 90A of the shielding plate 90 in the device depth direction D is disposed inside (in the direction opposite to the arrow S direction) with respect to the end portion 83S of the blower plate 83 in the device depth direction D.

Here, in a configuration in which the shielding plate 90 is separated from the blower plate 83 as viewed in the upper-lower direction Z (tenth comparative example), the functional component 152 may be heated between the shielding plate 90 and the blower plate 83. Compared with the tenth comparative example, in a configuration of the sixth modification, the functional component 152 is unlikely to be heated, and a temperature rise of the functional component 152 is prevented.

(Other Modifications)

In the present exemplary embodiment, an example in which the blower plate 83 is used as an example of the facing portion is described, but the present invention is not limited thereto. For example, the facing portion may be a guide portion that guides the recording medium P without blowing air to the transported recording medium P. The guide portion may be, for example, a guide plate that does not have a hole but is in contact with the lower surface of the recording medium P to guide the recording medium P.

In the present exemplary embodiment, the configuration in which the recording medium P is transported in a state in which the recording medium P is held by the gripper 54 is described, but the present invention is not limited thereto. For example, a configuration in which the recording medium P is transported using a transport body such as a transport belt or a transport roller may be used. In this configuration, the transport body such as the transport belt or the transport roller may be used as an example of the facing portion.

In the present exemplary embodiment, an example in which the recording medium P is used as an example of the transported material is described, the present invention is not limited thereto. For example, the transported material may be a to-be-heated material for the purpose of being heated without the purpose of being formed with an image.

In the present exemplary embodiment, the gripper 54 holds the front end portion of the recording medium P, but the present invention is not limited thereto. For example, the gripper 54 may be configured to hold a front end side of the recording medium P from a side end side of the recording medium P. The front end side of the recording medium is a portion on a downstream side (front side) of a center in the transport direction of the recording medium.

In the present exemplary embodiment, an example in which the chain 52 is used as an example of the circulating portion is described, the present invention is not limited thereto. For example, a circulating member such as a timing belt may be used as the circulating portion.

In the present exemplary embodiment, an example in which a fixing device that heats the toner image is used as the heating device is described, the present invention is not limited thereto. For example, a drying device that dries moisture of ink by heating the recording medium P onto which the ink is ejected, or a drying device that dries carrier oil of a liquid developer by heating the recording medium P onto which the toner image is transferred by the liquid developer may be used as the heating device.

In the present exemplary embodiment, the heater 72 that heats the recording medium P by the radiant heat is used as an example of the heating part, but the present invention is not limited thereto. For example, a warm air heater that heats the transported material such as the recording medium P by warm air may be used as the heating part. In the warm air heater that heats with the warm air, the air is diffused by hitting a surface of the blower plate 83, and the warm air is likely to hit the entire blower plate 83, so that the occurrence of the temperature distribution in the blower plate 83 is prevented.

On the other hand, in the heater 72 that heats the recording medium P by the radiant heat, the heat is less likely to be transferred to the entire blower plate 83 as compared with the above warm air heating. Therefore, in a configuration (first comparative example) in which the length of the heater 72 in the device depth direction D (or the transport direction X) is equal to or less than the length of the blower plate 83 in the device depth direction D (or the transport direction X), the temperature distribution is likely to occur in the blower plate 83. Therefore, a configuration in which the length of the heater 72 in the device depth direction D (or the transport direction X) is longer than the length of the blower plate 83 in the device depth direction D (or the transport direction X) is particularly effective.

The image forming apparatus 10 of the present exemplary embodiment may be configured as an image forming apparatus that forms an image on the both surfaces of the recording medium P. The image forming apparatus that forms images on the both surfaces of the recording medium P is configured to, for example, fix an image transferred to one surface of the recording medium P by the fixing device 16, and then invert front and back of the recording medium P and transport the recording medium P to the secondary transfer position T2, and transfer and fix an image to the other surface of the recording medium P.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A heating device comprising:

a heating unit configured to heat a transported material being transported in a transport direction in a non-contact manner with respect to the transported material; and a facing portion that is disposed on a side opposite to the heating unit with respect to the transported material and faces the heating unit in a facing direction intersecting the transport direction, wherein a length of the heating unit in the transport direction is longer than a length of the facing portion in the transport direction, or a length of the heating unit in an intersecting direction intersecting the transport direction and the facing direction is longer than a length of the facing portion in the intersecting direction, a shielding portion is provided between a component disposed in the facing direction with respect to a protruding portion of the heating unit that protrudes with respect to the facing portion and the protruding portion and configured to shield heat of the heating unit, the shielding portion is separated from the facing portion, and the shielding portion is disposed on a side opposite to a side of the heating unit with respect to the facing portion.

2. The heating device according to claim 1, wherein the length of the heating unit in the intersecting direction is longer than the length of the facing portion in the intersecting direction.

3. The heating device according to claim 2, wherein a length of the heating unit in the intersecting direction in a heating region of the heating unit is longer than the length of the facing portion in the intersecting direction.

4. The heating device according to claim 3, wherein the facing portion is a blower plate that has a blower port for blowing air to the transported material and is configured to float the transported material by blowing air passing through the blower port.

5. The heating device according to claim 2, wherein the facing portion is a blower plate that has a blower port for blowing air to the transported material and is configured to float the transported material by blowing air passing through the blower port.

6. The heating device according to claim 1, wherein the facing portion is a blower plate that has a blower port for blowing air to the transported material and is configured to float the transported material by blowing air passing through the blower port.

7. The heating device according to claim 1, wherein the shielding portion overlaps the facing portion as viewed in the facing direction.

8. The heating device according to claim 1, comprising:

a holder that holds the transported material; and a circulating portion as the component, wherein the holder is attached to the circulating portion, and the circulating portion circulates to transport the transported material, and the shielding portion is disposed between the circulating portion and the protruding portion.

9. An image forming apparatus comprising:

a forming unit that forms an image on a recording medium serving as a transported material; and the heating device according to claim 1 that heats the recording medium on which an image is formed by the forming unit.

10. A heating device comprising:

a heating unit configured to heat a transported material being transported in a transport direction in a non-contact manner with respect to the transported material; and a facing portion that is disposed on a side opposite to the heating unit with respect to the transported material and faces the heating unit in a facing direction intersecting the transport direction, wherein an end portion of the heating unit in the transport direction protrudes with respect to the facing portion in the transport direction, or an end portion of the heating unit in an intersecting direction intersecting the transport direction and the facing direction protrudes with respect to the facing portion in the intersecting direction, a shielding portion is provided between a component disposed in the facing direction with respect to a protruding portion of the heating unit that protrudes with respect to the facing portion and the protruding portion and configured to shield heat of the heating unit, the shielding portion is separated from the facing portion, and the shielding portion is disposed on a side opposite to a side of the heating unit with respect to the facing portion.

11. The heating device according to claim 10, wherein both end portions of the heating unit in the transport direction protrude with respect to the facing portion in the transport direction, or both end portions of the heating unit in the intersecting direction protrude with respect to the facing portion in the intersecting direction.

12. The heating device according to claim 11, wherein the facing portion is a blower plate that has a blower port for blowing air to the transported material and is configured to float the transported material by blowing air passing through the blower port.

13. The heating device according to claim 10, wherein the facing portion is a blower plate that has a blower port for blowing air to the transported material and is configured to float the transported material by blowing air passing through the blower port.

14. The heating device according to claim 10, wherein the shielding portion overlaps the facing portion as viewed in the facing direction.

15. The heating device according to claim 10, comprising:

a holder that holds the transported material; and a circulating portion as the component, wherein the holder is attached to the circulating portion, and the circulating portion circulates to transport the transported material, and the shielding portion is disposed between the circulating portion and the protruding portion.

16. A heating device comprising:

a heating unit configured to heat a transported material being transported in a transport direction in a non-contact manner with respect to the transported material; and a facing portion that is disposed on a side opposite to the heating unit with respect to the transported material and faces the heating unit in a facing direction intersecting the transport direction, wherein a length of the heating unit in the transport direction is longer than a length of the facing portion in the transport direction, or a length of the heating unit in an intersecting direction intersecting the transport direction and the facing direction is longer than a length of the facing portion in the intersecting direction, a shielding portion is provided between a component disposed in the facing direction with respect to a protruding portion of the heating unit that protrudes with respect to the facing portion and the protruding portion and configured to shield heat of the heating unit, the shielding portion is separated from the facing portion, and the heating device further comprises:

a holder that holds the transported material; and a circulating portion as the component, wherein the holder is attached to the circulating portion, and the circulating portion circulates to transport the transported material, and the shielding portion is disposed between the circulating portion and the protruding portion.

* * * * *